(12) United States Patent
Ankney et al.

(10) Patent No.: US 11,015,665 B2
(45) Date of Patent: May 25, 2021

(54) PROPORTIONAL CONTROL BRAKE

(71) Applicant: Hamilton Sundstrand Corporation, Charlotte, NC (US)

(72) Inventors: Darrell E. Ankney, Dixon, IL (US); Nicholas Wlaznik, Rockford, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 422 days.

(21) Appl. No.: 15/878,858

(22) Filed: Jan. 24, 2018

(65) Prior Publication Data
US 2019/0226536 A1 Jul. 25, 2019

(51) Int. Cl.
*F16D 55/36* (2006.01)
*B64C 9/14* (2006.01)
*F16D 65/16* (2006.01)
*B64C 3/00* (2006.01)
*B64C 13/00* (2006.01)
*B64C 9/00* (2006.01)
*F16D 121/14* (2012.01)
*F16D 121/22* (2012.01)
*B64D 45/00* (2006.01)

(52) U.S. Cl.
CPC .............. *F16D 55/36* (2013.01); *B64C 3/00* (2013.01); *B64C 9/00* (2013.01); *B64C 9/14* (2013.01); *B64C 13/00* (2013.01); *F16D 65/16* (2013.01); *B64C 2009/005* (2013.01); *B64D 2045/001* (2013.01); *F16D 2121/14* (2013.01); *F16D 2121/22* (2013.01)

(58) Field of Classification Search
CPC .. F16D 55/36; F16D 2121/22; F16D 2121/14; F16D 65/16; B64D 2045/001; B64C 2009/005; B64C 13/00; B64C 9/14; B64C 9/00; B64C 3/00
See application file for complete search history.

(56) References Cited

U.S. PATENT DOCUMENTS

| | | |
|---|---|---|
| 3,770,087 A | 11/1973 | Jaeschke |
| 3,924,902 A | 12/1975 | Engle |
| 4,030,581 A | 6/1977 | Giometti |
| 4,280,073 A | 7/1981 | Miller |
| 4,445,596 A | 5/1984 | Waters et al. |
| RE33,663 E | 8/1991 | Kade et al. |

(Continued)

FOREIGN PATENT DOCUMENTS

EP 1348622 A2 10/2003

OTHER PUBLICATIONS

Search Report dated May 10, 2019 in EP Application No. 19153080.7, 7 pages.

*Primary Examiner* — Hunter B Lonsberry
*Assistant Examiner* — Mathew Franklin Gordon
(74) *Attorney, Agent, or Firm* — Cantor Colburn LLP

(57) ABSTRACT

A proportional braking system is provided for use with a movable surface which is movable relative to a housing. The proportional braking system includes a variable displacement brake which is configured for displacement toward or away from braking engagement with the movable surface in proportion to an input command and a brake driver which is receptive of data reflective of movements of the movable surface relative to the housing and which issues the input command to the variable displacement brake in accordance with the data.

18 Claims, 10 Drawing Sheets

(56) References Cited

U.S. PATENT DOCUMENTS

| | | | |
|---|---|---|---|
| 5,746,487 A * | 5/1998 | Naito | B60T 8/17616 |
| | | | 303/116.1 |
| 6,659,398 B2 | 12/2003 | Serven | |
| 2003/0183728 A1 * | 10/2003 | Huynh | B64C 13/345 |
| | | | 244/224 |
| 2007/0130942 A1 * | 6/2007 | Tao | F16D 48/04 |
| | | | 60/547.1 |
| 2010/0038493 A1 | 2/2010 | Lang et al. | |
| 2010/0301785 A1 * | 12/2010 | Davis | B60T 13/04 |
| | | | 318/365 |
| 2013/0209240 A1 * | 8/2013 | McCaffrey | F01D 11/22 |
| | | | 415/173.2 |
| 2013/0327887 A1 | 12/2013 | Dyckrup et al. | |
| 2014/0138482 A1 | 5/2014 | Lang et al. | |

* cited by examiner

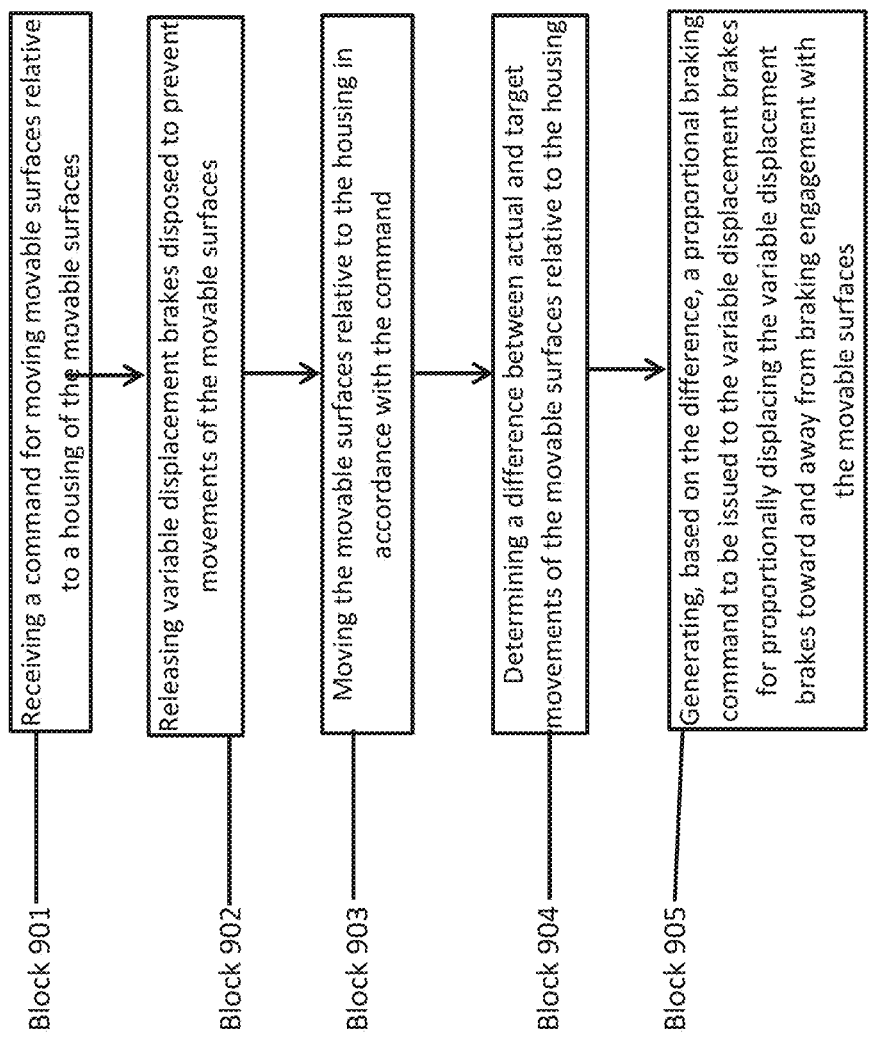

PROPORTIONAL CONTROL BRAKE

BACKGROUND

The following description relates to a proportional control brake and, more specifically, to a high-lift actuation system with a proportional control brake.

In aircraft design and aerospace engineering, a high-lift device is a component or mechanism on an aircraft's wing that increases the amount of lift produced by the wing. The device may be a fixed component or a movable mechanism which is deployed when required. Common movable high-lift devices include wing flaps and slats. Fixed devices include leading edge root extensions and boundary layer control systems.

For movable high-lift devices, movement control utilizes a dual, on-or-off operational state referred to as "bang-engaged" or "bang-disengaged." However, this type of movement control can lead to other issues. These include the fact that modern high-lift actuation systems require fast detections of failures but it is often the case that, upon detection of failure conditions such as asymmetries, skews or un-commanded motion, system response times to bring surface motion to a complete stop can be too long. This delayed response time can result in excess damage to the system components and the airframe.

BRIEF DESCRIPTION

According to an aspect of the disclosure, a proportional braking system is provided for use with a movable surface which is movable relative to a housing. The proportional braking system includes a variable displacement brake which is configured for displacement toward or away from braking engagement with the movable surface in proportion to an input command, and a brake driver which is receptive of data reflective of movements of the movable surface relative to the housing and which issues the input command to the variable displacement brake in accordance with the data.

In accordance with additional or alternative embodiments, the the variable displacement brake includes a first body that includes brake plates, a second body that includes thrust plates, the second body being disposed such that the thrust plates are interleaved with the brake plates and being rotatable and movable with respect to the first body, an elastic element that urges the second body to move toward the first body such that the thrust plates are urged toward braking engagements with the brake plates to inhibit rotations of the second body with respect to the first body; and a coil at a first side of the brake plates, which, when energized, generates a flux moment on the second body in opposition to the urging of the spring element.

In accordance with additional or alternative embodiments, the variable displacement brake is disposed proximate to at least one of a drive unit of the movable surface and a tip of the housing.

In accordance with additional or alternative embodiments, the variable displacement brake is disposed along a driveline of the movable surface.

In accordance with additional or alternative embodiments, the variable displacement brake includes a normally engaged brake, the input command includes a duty cycle percentage and an applied brake load of the normally engaged brake decreases as the input duty cycle percentage increases.

In accordance with additional or alternative embodiments, the variable displacement brake includes a normally engaged brake, the input command includes an input current and an applied brake load of the normally engaged brake decreases as the input current increases.

In accordance with additional or alternative embodiments, the variable displacement brake includes a normally disengaged brake, the input command includes a duty cycle percentage and an applied brake load of the normally disengaged brake decreases as the input duty cycle percentage decreases.

In accordance with additional or alternative embodiments, the sensors are configured to sense the movements of the movable surface relative to the housing and to generate the data accordingly.

According to another aspect of the disclosure, an aircraft is provided. The aircraft includes a fuselage, wings extending outwardly from the fuselage and comprising movable surfaces which are movable relative to the wings, a driving system configured to drive movements of the movable surfaces relative to the wings and a proportional braking system configured to apply a braking load to the movable surfaces to inhibit the movements thereof relative to the wings. The proportional braking system includes variable displacement brakes which are each configured for displacement toward or away from braking engagement with a corresponding one of the movable surfaces in proportion to an input command and a brake driver which is receptive of data reflective of movements of the movable surfaces relative to the wings and which issues input commands to the variable displacement brakes in accordance with the data.

In accordance with additional or alternative embodiments, each of the variable displacement brakes includes a first body including brake plates, a second body that includes thrust plates, the second body being disposed such that the thrust plates are interleaved with the brake plates and being rotatable and movable with respect to the first body, an elastic element that urges the second body to move toward the first body such that the thrust plates are urged toward braking engagements with the brake plates to inhibit rotations of the second body with respect to the first body and a coil at a first side of the brake plates, which, when energized, generates a flux moment on the second body in opposition to the urging of the spring element.

In accordance with additional or alternative embodiments, the variable displacement brakes are respectively disposed proximate to at least one of a drive unit of the movable surfaces and tips of the wings.

In accordance with additional or alternative embodiments, the variable displacement brakes are disposed along drivelines of the movable surfaces.

In accordance with additional or alternative embodiments, at least one of the variable displacement brakes includes a normally engaged brake, the input command includes a duty cycle percentage and an applied brake load of the normally engaged brake decreases as the input duty cycle percentage increases.

In accordance with additional or alternative embodiments, at least one of the variable displacement brakes includes a normally engaged brake, the input command includes an input current and an applied brake load of the normally engaged brake decreases as the input current increases.

In accordance with additional or alternative embodiments, at least one of the variable displacement brakes includes a normally disengaged brake, the input command includes a duty cycle percentage and an applied brake load of the normally disengaged brake decreases as the input duty cycle percentage decreases.

In accordance with additional or alternative embodiments, sensors are configured to sense the movements of the movable surfaces relative to the wings and to generate the data accordingly.

According to yet another aspect of the disclosure, a method of operating a proportional braking system is provided. The method includes receiving a command for moving movable surfaces relative to a housing of the movable surfaces, releasing variable displacement brakes disposed to prevent movements of the movable surfaces, moving the movable surfaces relative to the housing in accordance with the command, determining a difference between actual and target movements of the movable surfaces relative to the housing and generating, based on the difference, a proportional braking command to be issued to the variable displacement brakes for proportionally displacing the variable displacement brakes toward and away from braking engagement with the movable surfaces.

In accordance with additional or alternative embodiments, at least one of the variable displacement brakes includes a normally engaged brake, the proportional braking command includes a duty cycle percentage and an applied brake load of the normally engaged brake decreases as the input duty cycle percentage increases.

In accordance with additional or alternative embodiments, at least one of the variable displacement brakes includes a normally engaged brake, the proportional braking command includes an input current and an applied brake load of the normally engaged brake decreases as the input current increases.

In accordance with additional or alternative embodiments, at least one of the variable displacement brakes includes a normally disengaged brake, the proportional braking command includes a duty cycle percentage and an applied brake load of the normally disengaged brake decreases as the input duty cycle percentage decreases.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 9 is a flow diagram illustrating a method of operating a proportional brake system in accordance with embodiments.

These and other advantages and features will become more apparent from the following description taken in conjunction with the drawings.

DETAILED DESCRIPTION

As will be described below, a proportional brake is provided for use on torque tubes (i.e., drive line systems) and/or on hydraulic or electric motors. The proportional brake includes a proportionally current controlled friction brake that allows for a variable applied brake force. This variable (proportional) controlled force to the break allows for precise braking for slat and flap system accelerations and decelerations including emergency stop conditions. The proportional brake could also be provided as a variable load drag during normal system operation. That is, while a brake is typically designed to be in the normally engaged state with no current applied, a proportional brake that is provided for use as an active drag brake can be designed for assumption of a normally disengaged state with no current applied.

Figure 2:
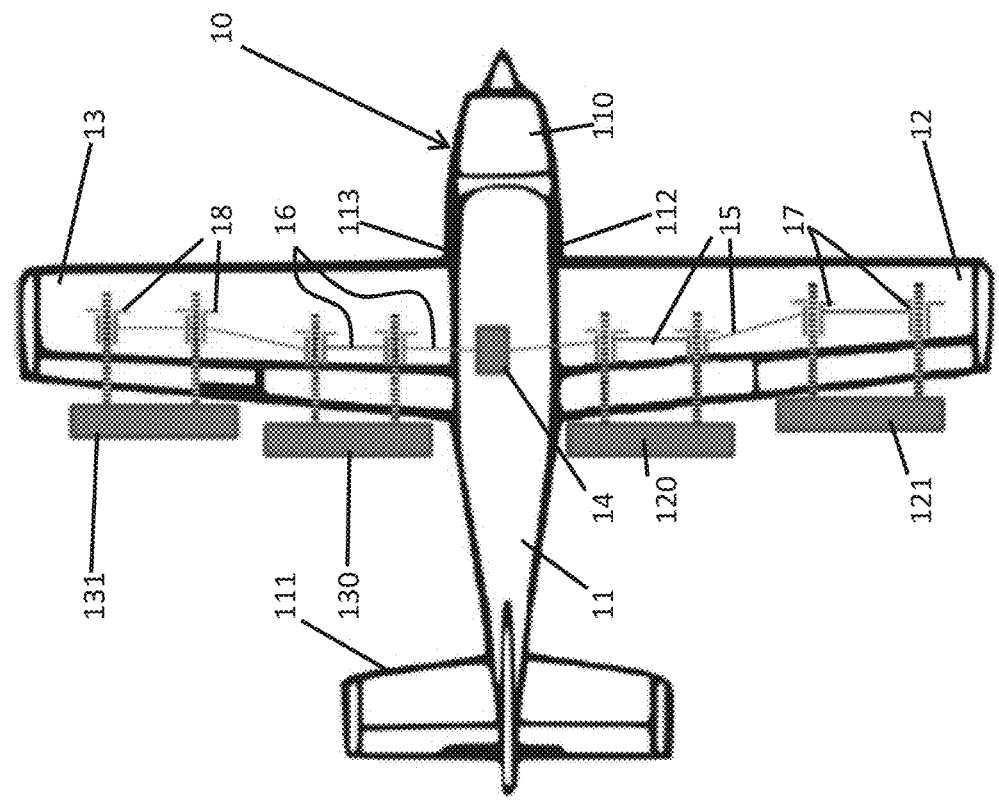
FIG. 2 is a top down cutaway view of an aircraft with movable surfaces in deployed positions in accordance with embodiments.
Figure 1:
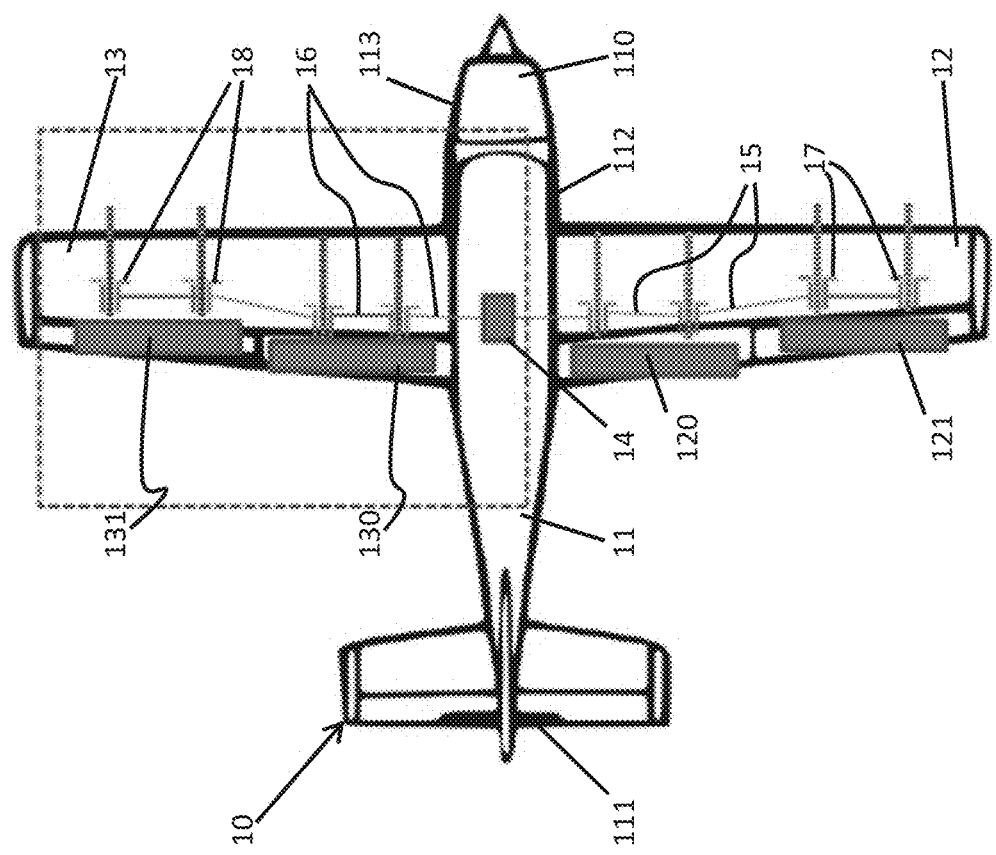
FIG. 1 is a top down cutaway view of an aircraft with movable surfaces in stowed positions in accordance with embodiments.

With reference to FIGS. 1 and 2, an aircraft 10 is provided. As shown in FIGS. 1 and 2, the aircraft 10 includes a fuselage 11 having a forward section 110, a rear tail section 111 and right- and left-hand-sides (RHS and LHS) 112 and 113. An RHS wing 12 extends outwardly from the RHS 112 of the fuselage 11 and an LHS wing 13 extends outwardly from the LHS 113 of the fuselage 11. Inboard and outboard controllable or movable surfaces 120 and 121 are provided on a trailing edge of the RHS wing 12 and inboard and outboard movable surfaces 130 and 131 are provided on a trailing edge of the LHS wing 13.

The inboard and outboard movable surfaces 120 and 121 of the RHS wing 12 and the inboard and outboard movable surfaces 130 and 131 of the LHS wing 13 may be provided on either the trailing or the leading edges of the RHS and LHS wings 12 and 13 and may be provided as flaps, slats, ailerons, etc.

For purposes of clarity and brevity, the following description will relate to the case in which the inboard and outboard movable surfaces are provided as flaps on the trailing sides of the RHS wing 12 and the LHS wing 13.

In any case, respective positions of the inboard and outboard movable surfaces 120 and 121 of the RHS wing 12 and the inboard and outboard movable surfaces 130 and 131 of the LHS wing 13 are movable in pivot and translation dimensions. For example, each of the inboard and outboard movable surfaces 120 and 121 of the RHS wing 12 and the inboard and outboard movable surfaces 130 and 131 of the LHS wing 13 may be translated from stowed positions as shown in FIG. 1 to deployed positions as shown in FIG. 2.

Figure 3:
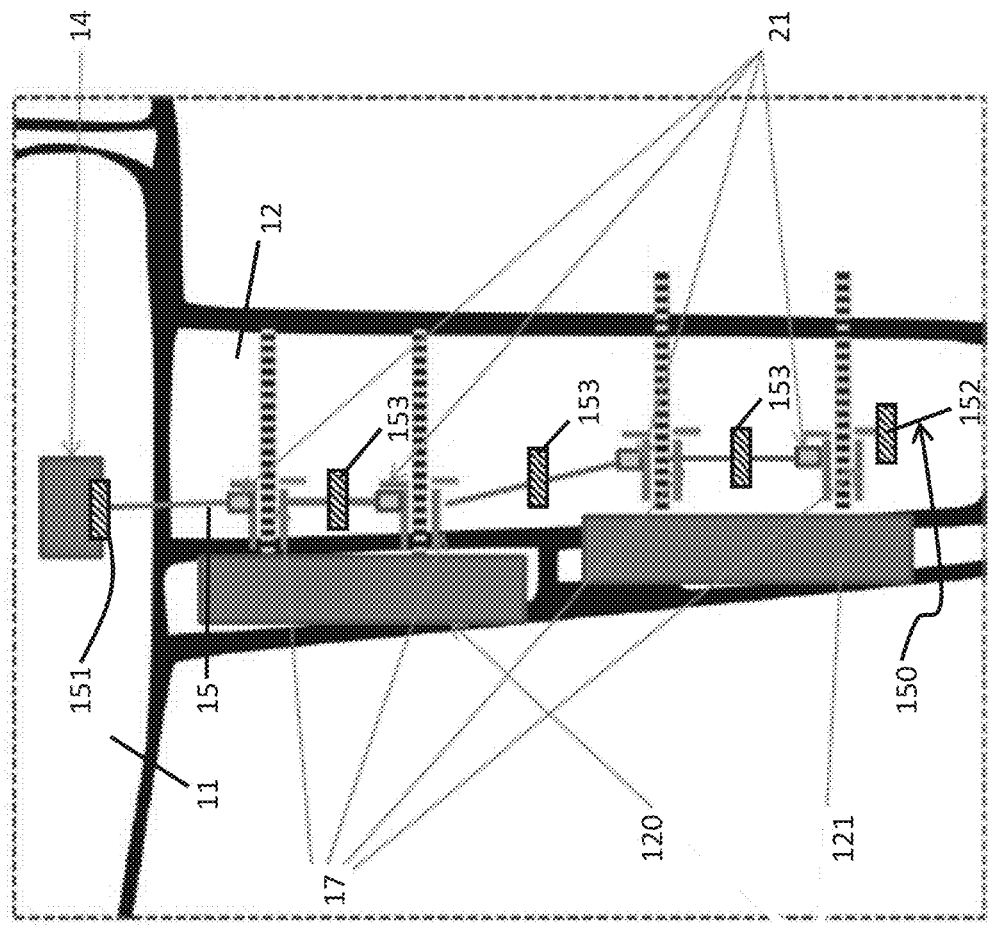
FIG. 3 is an enlarged top down cutaway view of a right-hand-side wing of the aircraft of FIG. 1 in accordance with embodiments.
Figure 4:
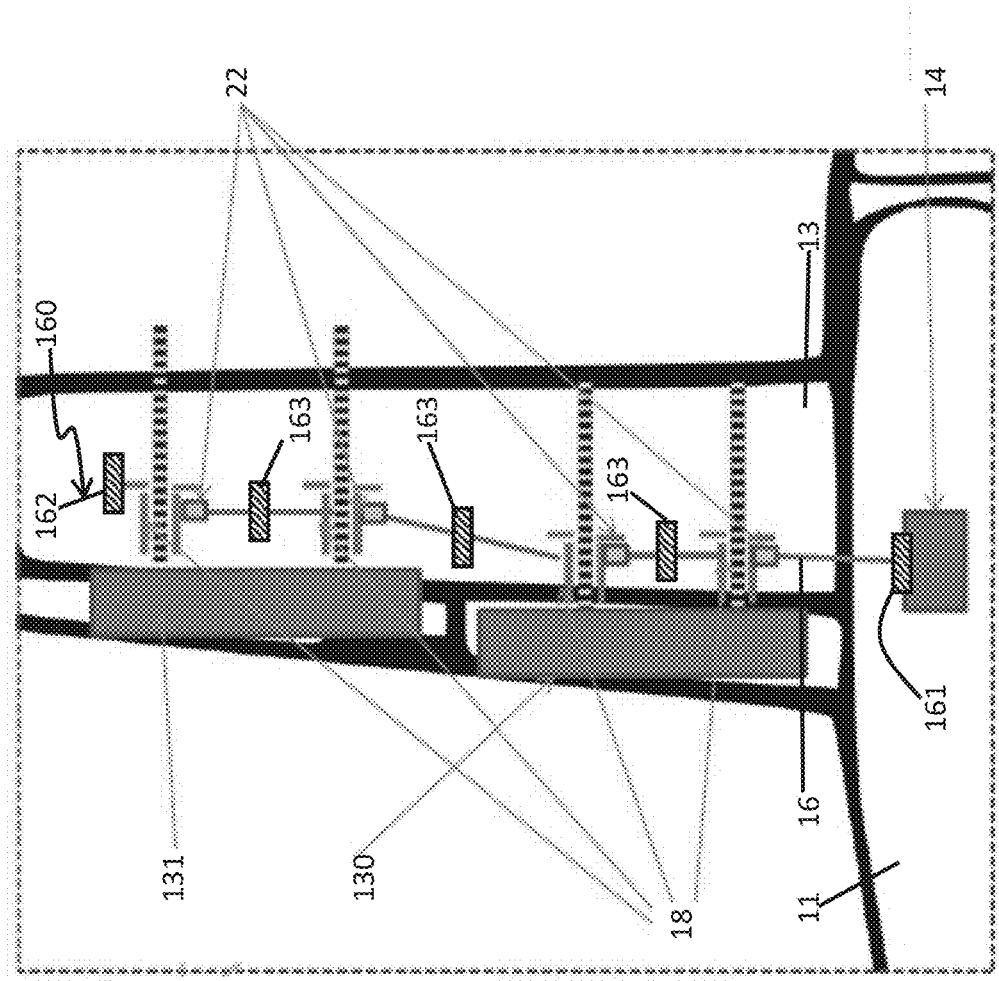
FIG. 4 is an enlarged top down cutaway view of a left-hand-side wing of the aircraft of FIG. 1 in accordance with embodiments.

With continued reference to FIGS. 1 and 2 and with additional reference to FIGS. 3 and 4, the aircraft 10 further includes a power drive unit (PDU) 14 which is housed or accommodated within the fuselage 11, a plurality of RHS torque tubes 15, a plurality of LHS torque tubes 16, a plurality of RHS actuators 17, which are distributed along the RHS wing 12, and a plurality of LHS actuators 18, which are distributed along the LHS wing 13. The RHS actuators 17 are driven by torque generated in the PDU 14 and transmitted to the RHS actuators 17 by the plurality of RHS torque tubes 15. The RHS actuators 17 are thus capable of using that torque to control positions of the inboard and outboard movable surfaces 120 and 121 of the RHS wing 12. The LHS actuators 18 are similarly driven by torque generated in the PDU 14 and transmitted to the LHS actuators 18 by the plurality of LHS torque tubes 16. The LHS actuators 18 are thus capable of using that torque to control positions of the inboard and outboard movable surfaces 130 and 131 of the LHS wing 13.

The plurality of RHS torque tubes 15 cooperatively form a RHS driveline 150 and the plurality of LHS torque tubes cooperatively form an LHS driveline 160.

Figure 5:
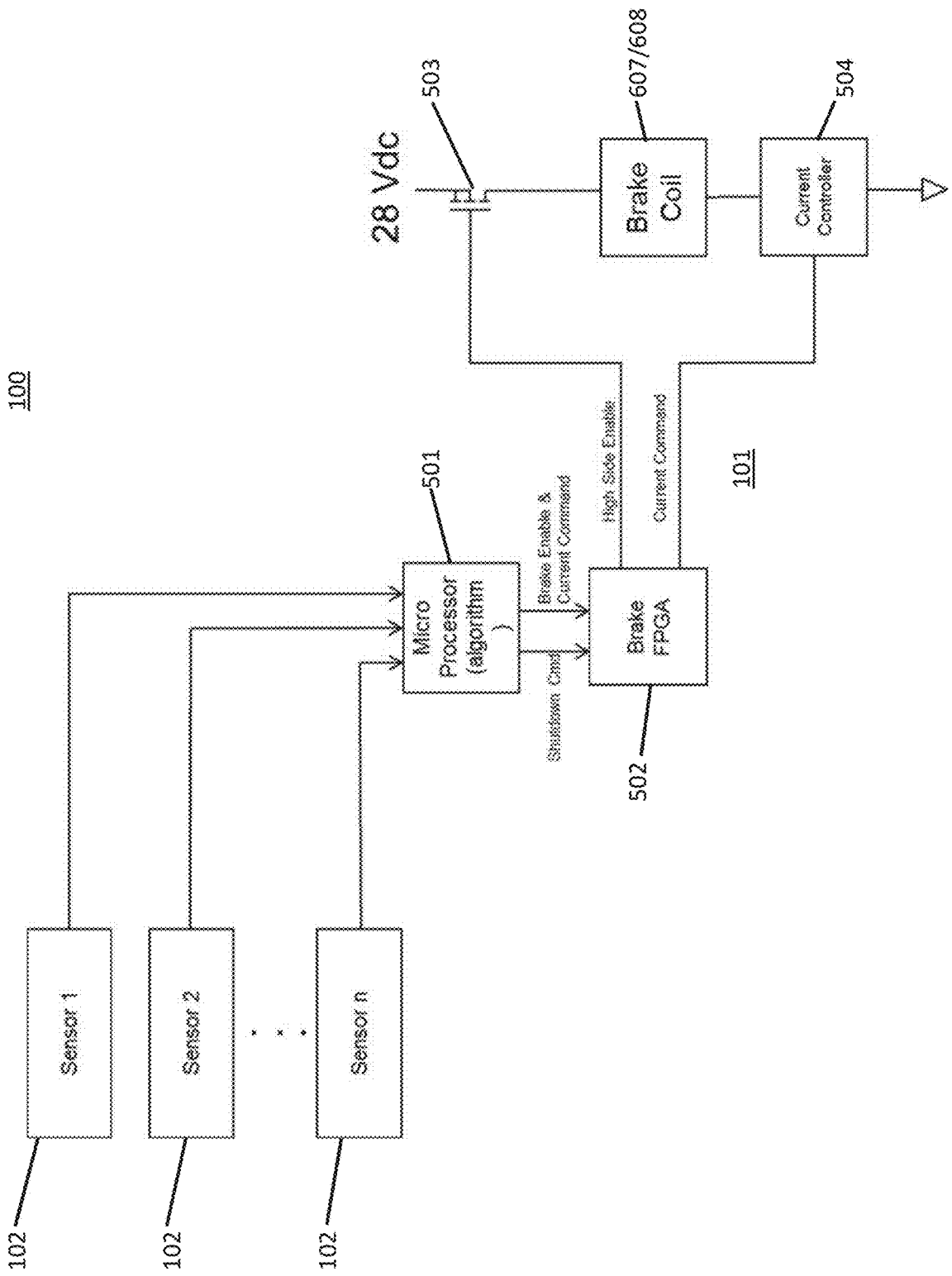
FIG. 5 is a schematic diagram illustrating a proportional braking system and a brake driver in accordance with embodiments.
Figure 6:
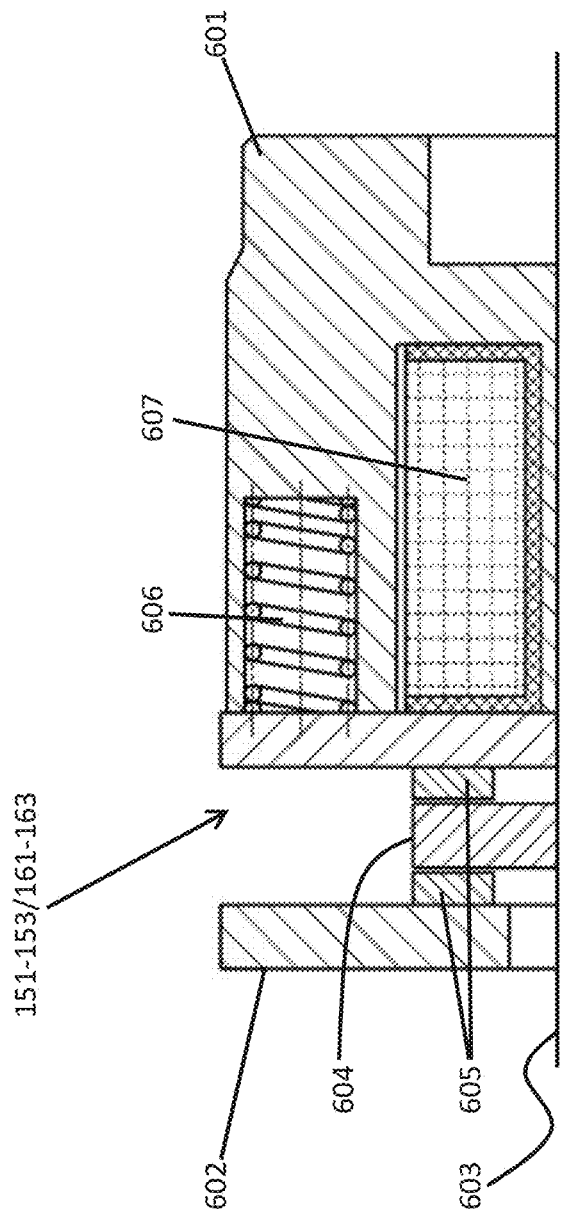
FIG. 6 is a schematic diagram of a proportional brake in accordance with embodiments.
Figure 7:
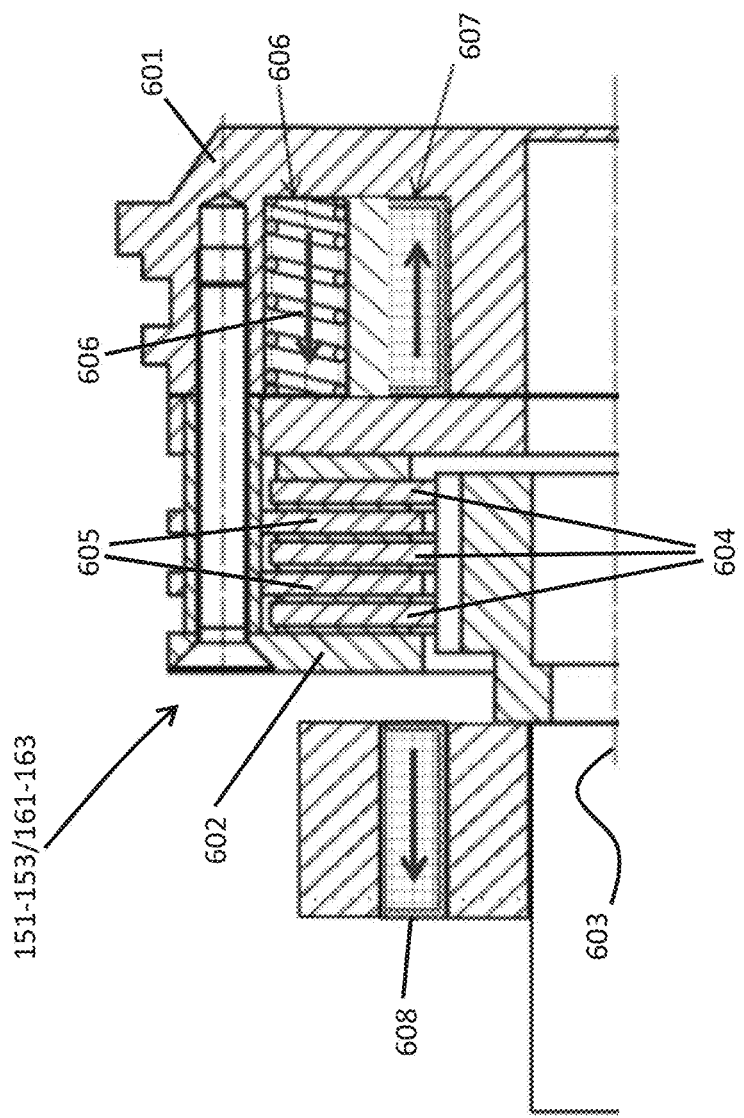
FIG. 7 is a schematic diagram of a proportional brake in accordance with embodiments.

As shown in FIGS. 3 and 4 and with additional reference to FIGS. 5-7, the aircraft 10 may also include a proportional braking system 100, a brake driver 101 and sensors 102.

The proportional braking system 100 includes proportional or variable displacement brakes 151 and 152 at or proximate to the side of the PDU 14 associated with the RHS wing 12 and at the end of the RHS driveline 150 at or proximate to a tip of the RHS wing 12, respectively (see FIG. 3), as well as proportional or variable displacement brakes 161 and 162 at or proximate to the side of the PDU 14 associated with the LHS wing 13 and at the end of the LHS driveline 160 at or proximate to a tip of the LHS wing 13, respectively (see FIG. 4). In addition or as an alternative, the proportional braking system 100 may also include variable displacement brakes 153 disposed along the RHS driveline 150 and variable displacement brakes 163 disposed along the LHS driveline 160.

The variable displacement brakes 151-153 and 161-163 of the proportional braking system 100 are configured for displacement toward or away from braking engagement with a corresponding one of the movable surfaces 120 and 121 of the RHS wing 12 and a corresponding one of the movable surfaces 130 and 131 of the LHS wing 13 in proportion to input commands. The variable displacement brakes 151-153 and 161-163 thereby apply braking loads to the movable surfaces 120 and 121 of the RHS wing 12 and to the movable surfaces 130 and 131 of the LHS wing 13 to inhibit the movements thereof relative to the RHS and LHS wings 12 and 13, respectively.

As shown in FIG. 6, the variable displacement brakes 151-153 and 161-163 may each include a first body 601 and a second body 602. The second body 602 is rotatable with respect to the first body 601 with movements of a corresponding one of the movable surfaces 120 and 121 of the RHS wing 12 and the movable surfaces 130 and 131 of the LHS wing 13. The second body 602 is also movable in an axial direction with respect to the first body 601. The second body 602 includes a shaft element 603 that has a portion thereof which extends through a portion of the first body 601 and has outwardly extending thrust plates 604. The first body 601 has friction or brake plates 605 interleaved with the thrust plates 604, a spring element 606 that applies a bias to the first body 601 which urges the thrust plates 604 toward braking engagements with the brake plates 605 and a coil 607.

When the coil 607 is de-energized, the bias applied by the spring element 606 forces the first body 601 to move toward the position at which the thrust plates 604 engage with the brake plates 605. Such engagements inhibit or prevent the rotation of the second body 602 with respect to the first body 601 and in turn inhibit or prevent the movements of the corresponding one of the movable surfaces 120 and 121 of the RHGS wing 12 and the movable surfaces 130 and 131 of the LHS wing 13. When the coil 607 is energized, however, the coil 607 generates flux that maintains the first body 601 in a position at which the thrust plates 604 are displaced from the brake plates 605 in opposition to the bias applied by the spring element 606.

As shown in FIG. 7, the variable displacement brakes 151-153 and 161-163 may each further include a booster coil 608. This booster coil 608 is wound on an opposite side of the brake plates 605 from the coil 607 and is generally energized and de-energized as the coil 607 is de-energized and energized, respectively.

That is, when the coil 607 is de-energized and the booster coil 608 is energized, flux generated by the energized booster coil 608 aids the bias applied by the spring element 606 and forces the first body 601 to move toward the position at which the thrust plates 604 engage with the brake plates 605 more strongly and faster than possible with just the action of the spring element 606. When the coil 607 is energized, the booster coil 608 may be de-energized or at least may only be energized to such an extent that its generated flux, in combination with the action of the spring element 606, does not overcome the flux of the energized coil 607.

In accordance with the embodiments of FIGS. 6 and 7, the variable displacement brakes 151-153 and 161-163 may be configured such that the position at which the thrust plates 604 engage with the brake plates 605 is variable, as is explained further below. In such cases, as the coil 607 is slightly energized (and the booster coil 608 where applicable is de-energized), the thrust plates 604 begin to slightly disengage from the brake plates 605 and thus begin to decrease inhibition of the rotation of the second body 602 with respect to the first body 601 and the movements of the corresponding one of the movable surfaces 120 and 121 of the RHS wing 12 and the movable surfaces 130 and 131 of the LHS wing 13. By contrast, as the coil 607 is nearly or fully energized (and the booster coil 608 where applicable is de-energized), the thrust plates 604 will have nearly or fully disengaged from the brake plates 605 and will thus allow with little to no inhibition the rotation of the second body 602 with respect to the first body 601 and the movements of the corresponding one of the movable surfaces 120 and 121 of the RHGS wing 12 and the movable surfaces 130 and 131 of the LHS wing 13.

It is to be understood that the configurations of the variable displacement brakes 151-153 and 161-163 described above relate to normally engaged brake assemblies but that such configurations are not required. In fact, the variable displacement brakes 151-153 and 161-163 could be reversely configured as normally disengaged brake assemblies as well. The following description will, however, generally relate only to the cases of the variable displacement brakes 151-153 and 161-163 being normally engaged brake assemblies for purposes of clarity and brevity.

The sensors 102 are disposed along the RHS wing 12 and the LHS wing 13 and are configured to sense the movements of the movable surfaces 120 and 121 relative to the RHS wing 12 and to sense the movements of the movable surfaces 130 and 131 relative to the LHS wing 13 and to generate data accordingly. The brake driver 101 is disposed in signal communication with the sensors 102 and is thus receptive of the data generated by the sensors 102. The brake driver 101 issues input commands to the variable displacement brakes 151-153 and 161-163 in accordance with the received data.

As shown in FIG. 5, the brake driver 101 includes a microprocessor 501, a brake field programmable gate array (FPGA) 502, a current source 503 and a current controller 504. The microprocessor 501 is receptive of the data from the sensors 102 and includes logic by which a shutdown command and a brake enable and current command are generated in accordance with the data and issued to the brake FPGA 502. The brake FPGA is configured to issue to the current source 503 a high side enable signal which permits current to be supplied to the coils 607 and where applicable the booster coils 608 and to issue to the current controller 504 a current command for proportional control of the operations of the variable displacement brakes 151-153 and 161-163.

During flight operations, when the pilot commands motion of the movable surfaces 120 and 121 of the RHS wing 12 and the movable surfaces 130 and 131 of the LHS wing 13, and the PDU 14 responds, the variable displacement brakes 151-153 and 161-163 are released by the brake driver 101 in response to the shutdown command being generated and issued by the microprocessor 501 (e.g., for the normally engaged brakes, the coils 607 are nearly or fully energized and the booster coils 608 where applicable are de-energized). Subsequently, as the movable surfaces 120 and 121 of the RHS wing 12 and the movable surfaces 130 and 131 of the LHS wing 13 move, surface motion feedback is provided by the sensors 102 whereby the variable displacement brakes 151-153 and 161-163 can be variously engaged and disengaged as required.

On the other hand, when un-commanded movement of the movable surfaces 120 and 121 of the RHS wing 12 and the movable surfaces 130 and 131 of the LHS wing 13 are sensed by the sensors 102 during flight operations, the microprocessor 501 of the brake driver 101 may issue the shutdown command to the brake FPGA 502 to de-energize the coil 607 and may issue the brake enable and current command to the brake FPGA 502 to energize the booster coil 608. In this way, the flux generated by the booster coil 608 can aid the spring element 606 in moving the second body 602 toward the position at which the thrust plates 604 engage with the brake plates 605 faster than otherwise possible with just the action of the spring element 606.

That is, in an event that un-commanded or undesirable motion is detected by the sensors 102, one or more of the variable displacement brakes 151-153 and 161-163 can be independently or dependently controlled to control, slow or halt the motion. For example, in an event a detected speed of commanded motion of the movable surfaces 120 and 121 or 130 and 131 exceeds a commanded speed, one or more of the variable displacement brakes 151-153 and 161-163 can be engaged to slow the actual speed of the motion of the movable surfaces 120 and 121 and 130 and 131 without stopping the motion entirely. Similarly, in an event un-commanded motion of the movable surfaces 120 and 121 or 130 and 131 is detected at any speed, one or more of the variable displacement brakes 151-153 and 161-163 can be engaged to stop the motion entirely.

Figure 8B:
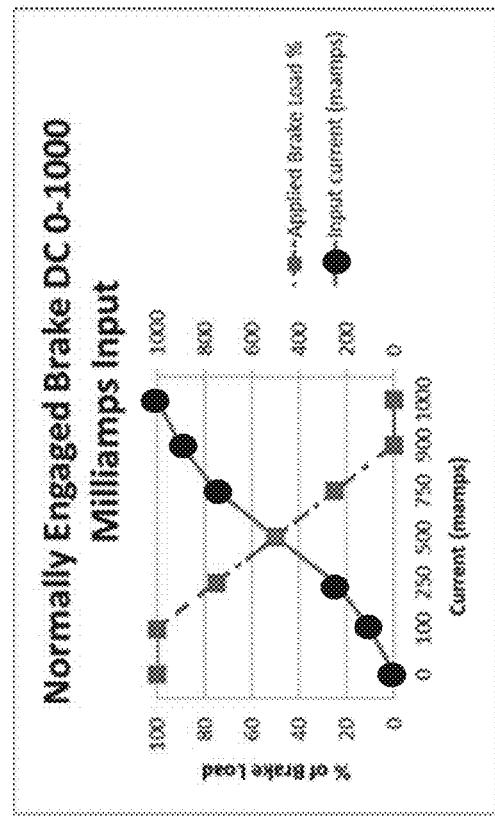
FIG. 8B is a graphical depiction of an operation of a proportional brake in accordance with embodiments.
Figure 8A:
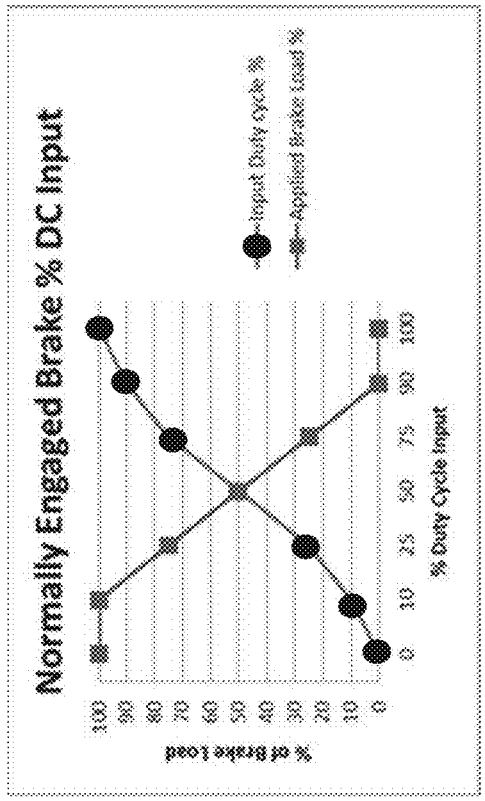
FIG. 8A is a graphical depiction of an operation of a proportional brake in accordance with embodiments.
Figure 8C:
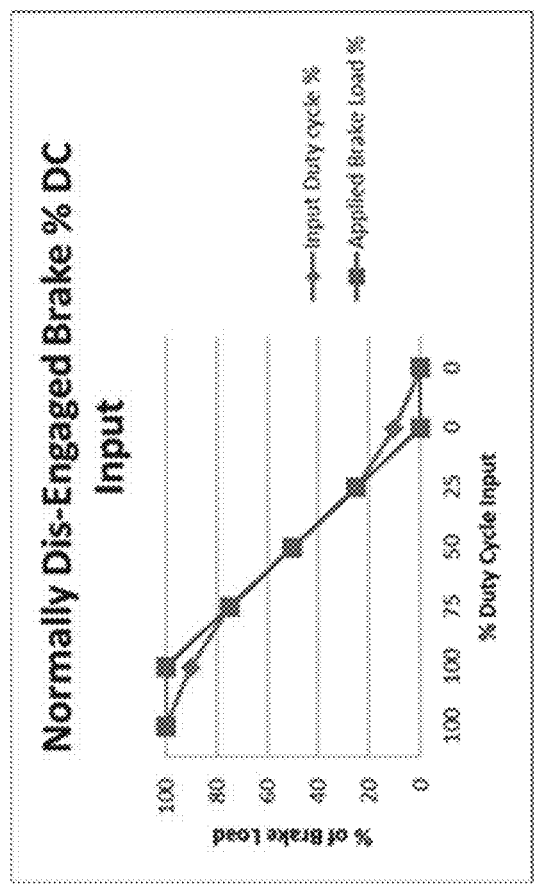
FIG. 8C is a graphical depiction of an operation of a proportional brake in accordance with embodiments.

In accordance with embodiments and with reference to FIGS. 8A, 8B and 8C, the proportional control of the operations of the variable displacement brakes 151-153 and 161-163 will now be described. As shown in FIG. 8A, at least one of the variable displacement brakes 151-153 and 161-163 may include a normally engaged brake and the input command issued by the microprocessor 501 via the brake FPGA 502 may include a duty cycle percentage. Here, an applied brake load of the normally engaged brake decreases as the input duty cycle percentage increases. As shown in FIG. 8B, at least one of the variable displacement brakes 151-153 and 161-163 may include a normally engaged brake and the input command issued by the microprocessor 501 via the brake FPGA 502 may include an input current. Here, an applied brake load of the normally engaged brake decreases as the input current increases. As shown in FIG. 8C, at least one of the variable displacement brakes 151-153 and 161-163 may include a normally disengaged brake and the input command issued by the microprocessor 501 via the brake FPGA 502 may include a duty cycle percentage. Here, an applied brake load of the normally disengaged brake decreases as the input duty cycle percentage decreases.

With reference to FIG. 9, a method of operating the proportional braking system 101 and the brake driver 102 is provided. As shown in FIG. 9, the method may include receiving a command for moving movable surfaces relative to a housing of the movable surfaces (block 901), releasing variable displacement brakes disposed to prevent movements of the movable surfaces (block 902) and moving the movable surfaces relative to the housing in accordance with the command (block 903). At this point, the method includes determining a difference between actual and target movements of the movable surfaces relative to the housing (block 904) and generating, based on the difference, a proportional braking command to be issued to the variable displacement brakes for proportionally displacing the variable displacement brakes toward and away from braking engagement with the movable surfaces (block 905).

Figure 10:
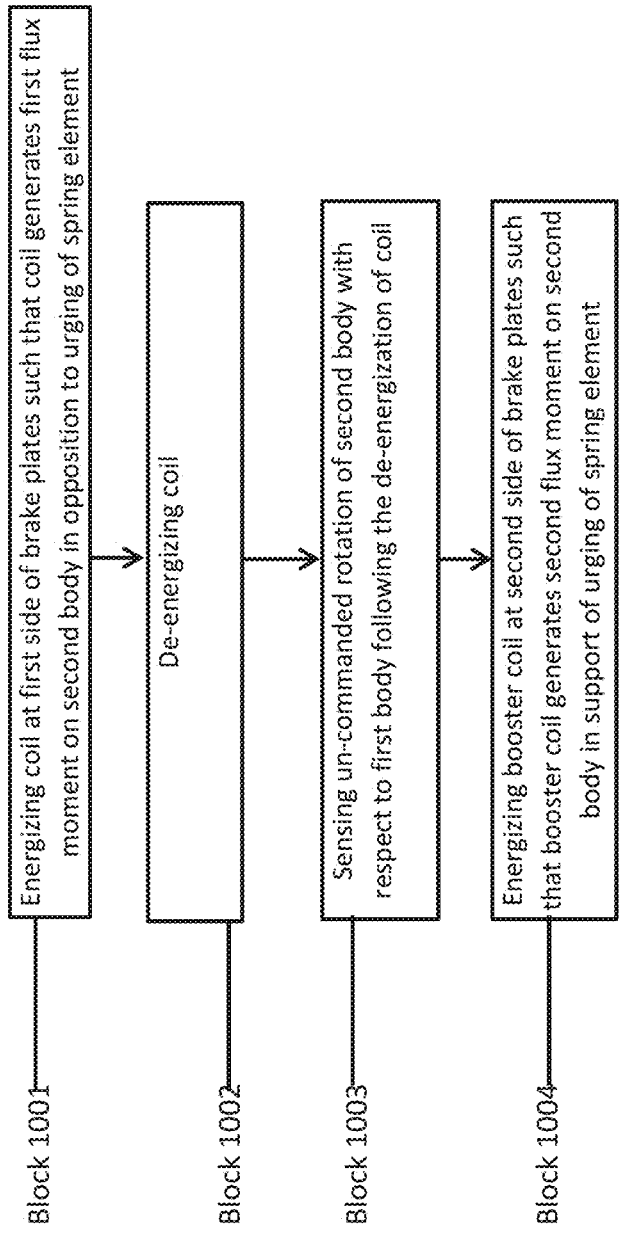
FIG. 10 is a flow diagram illustrating a method of operating a proportional brake in accordance with embodiments.

With reference to FIG. 10, a method of operating the proportional brake described herein is provided. As shown in FIG. 10, the method includes energizing a coil at a first side of the brake plates such that the coil generates a first flux moment on the second body in opposition to the urging of the spring element (block 1001), de-energizing the coil (block 1002) and energizing a booster coil at a second side of the brake plates such that the booster coil generates a second flux moment on the second body in support of the urging of the spring element (block 1004). In accordance with embodiments, the energizing of the coil may include increasing and decreasing an input duty cycle of the coil and/or increasing and decreasing an input current of the coil and the energizing of the booster coil may be executed subsequent to the de-energizing of the coil and/or concurrently with the energizing of the coil. In accordance with further embodiments, the method may also include sensing un-commanded rotation of the second body with respect to the first body following the de-energization of the coil (block 1004) wherein the energizing of the booster coil of block 1004 is responsive to the sensing of the un-commanded rotation.

The proportional brake described herein allows for variable brake speed control during system acceleration and deceleration and can be used as a fixed or variable drag brake and a normal system brake. The proportional brake also exhibits reduced brake wear because of the variable braking capability as opposed to hard engage/disengage brake usage. The proportional brake also exhibits reduced weight and cost especially where it is used as a normal stop brake and a drag brake. This in turn results in a lower quantity of line replaceable units (LRUs).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A proportional braking system for use with a movable surface which is movable relative to a housing, the proportional braking system comprising:
   a variable displacement brake which is configured for displacement toward or away from braking engagement with the movable surface in proportion to an input command; and
   a brake driver which is receptive of data reflective of movements of the movable surface relative to the housing and which issues the input command to the variable displacement brake in accordance with the data,
   wherein the variable displacement brake comprises:
   a first body comprising brake plates;
   a second body comprising thrust plates, the second body being disposed such that the thrust plates are interleaved with the brake plates and being rotatable and movable with respect to the first body;
   an elastic element that urges the second body to move toward the first body such that the thrust plates are urged toward braking engagements with the brake plates to inhibit rotations of the second body with respect to the first body;
   a coil at a first side of the brake plates, which, when energized, generates a flux moment on the second body in opposition to the urging of the elastic element; and
   a booster coil at a second side of the brake plates, which, when energized, generates a second flux moment on the second body in support of the urging of the elastic element.

2. The proportional braking system according to claim 1, wherein the variable displacement brake is disposed proximate to at least one of a drive unit of the movable surface and a tip of the housing.

3. The proportional braking system according to claim 1, wherein the variable displacement brake is disposed along a driveline of the movable surface.

4. The proportional braking system according to claim 1, wherein:
   the variable displacement brake comprises a normally engaged brake and the input command comprises a duty cycle percentage, and
   an applied brake load of the normally engaged brake decreases as the input duty cycle percentage increases.

5. The proportional braking system according to claim 1, wherein:
   the variable displacement brake comprises a normally engaged brake and the input command comprises an input current, and
   an applied brake load of the normally engaged brake decreases as the input current increases.

6. The proportional braking system according to claim 1, wherein:
   the variable displacement brake comprises a normally disengaged brake and the input command comprises a duty cycle percentage, and
   an applied brake load of the normally disengaged brake decreases as the input duty cycle percentage decreases.

7. The proportional braking system according to claim 1, further comprising sensors configured to sense the movements of the movable surface relative to the housing and to generate the data accordingly.

8. An aircraft, comprising:
   a fuselage;
   wings extending outwardly from the fuselage and comprising movable surfaces which are movable relative to the wings;
   a driving system configured to drive movements of the movable surfaces relative to the wings; and
   a proportional braking system configured to apply a braking load to the movable surfaces to inhibit the movements thereof relative to the wings, the proportional braking system comprising:
   variable displacement brakes which are each configured for displacement toward or away from braking engagement with a corresponding one of the movable surfaces in proportion to an input command; and
   a brake driver which is receptive of data reflective of movements of the movable surfaces relative to the wings and which issues input commands to the variable displacement brakes in accordance with the data,
   wherein each of the variable displacement brakes comprises:
   a first body comprising brake plates;
   a second body comprising thrust plates, the second body being disposed such that the thrust plates are interleaved with the brake plates and being rotatable and movable with respect to the first body;
   an elastic element that urges the second body to move toward the first body such that the thrust plates are urged toward braking engagements with the brake plates to inhibit rotations of the second body with respect to the first body;
   a coil at a first side of the brake plates, which, when energized, generates a flux moment on the second body in opposition to the urging of the elastic element; and
   a booster coil at a second side of the brake plates, which, when energized, generates a second flux moment on the second body in support of the urging of the elastic element.

9. The proportional brake system according to claim 8, wherein the variable displacement brakes are respectively disposed proximate to at least one of a drive unit of the movable surfaces and tips of the wings.

10. The proportional brake system according to claim 8, wherein the variable displacement brakes are disposed along drivelines of the movable surfaces.

11. The proportional brake system according to claim 8, wherein:
    at least one of the variable displacement brakes comprises a normally engaged brake and the input command comprises a duty cycle percentage, and
    an applied brake load of the normally engaged brake decreases as the input duty cycle percentage increases.

12. The proportional brake system according to claim 8, wherein:

at least one of the variable displacement brakes comprises a normally engaged brake and the input command comprises an input current, and an applied brake load of the normally engaged brake decreases as the input current increases.

13. The proportional brake system according to claim 8, wherein:

at least one of the variable displacement brakes comprises a normally disengaged brake and the input command comprises a duty cycle percentage, and an applied brake load of the normally disengaged brake decreases as the input duty cycle percentage decreases.

14. The proportional brake system according to claim 8, further comprising sensors configured to sense the movements of the movable surfaces relative to the wings and to generate the data accordingly.

15. A method of operating a proportional braking system, the method comprising:

receiving a command for moving movable surfaces relative to a housing of the movable surfaces;

releasing variable displacement brakes disposed to prevent movements of the movable surfaces;

moving the movable surfaces relative to the housing in accordance with the command;

determining a difference between actual and target movements of the movable surfaces relative to the housing; and generating, based on the difference, a proportional braking command to be issued to the variable displacement brakes for proportionally displacing the variable displacement brakes toward and away from braking engagement with the movable surfaces, wherein:

each variable displacement brake comprises brake and thrust plates, an elastic element that causes the thrust plates to be urged toward braking engagements with the brake plates, a coil at a first side of the brake plates and a booster coil at a second side of the brake plates, and the proportional braking command causes either the coil or the booster coil to become energized thereby generating a flux moment in opposition to or in support of the urging of the elastic element, respectively.

16. The method according to claim 15, wherein:

at least one of the variable displacement brakes comprises a normally engaged brake and the proportional braking command comprises a duty cycle percentage, and an applied brake load of the normally engaged brake decreases as the input duty cycle percentage increases.

17. The proportional brake system according to claim 15, wherein:

at least one of the variable displacement brakes comprises a normally engaged brake and the proportional braking command comprises an input current, and an applied brake load of the normally engaged brake decreases as the input current increases.

18. The proportional brake system according to claim 15, wherein:

at least one of the variable displacement brakes comprises a normally disengaged brake and the proportional braking command comprises a duty cycle percentage, and an applied brake load of the normally disengaged brake decreases as the input duty cycle percentage decreases.

\* \* \* \* \*